US009639968B2

(12) United States Patent
Kim et al.

(10) Patent No.: US 9,639,968 B2
(45) Date of Patent: May 2, 2017

(54) GENERATING AN AUGMENTED VIEW OF A LOCATION OF INTEREST (71) Applicant: HARMAN INTERNATIONAL INDUSTRIES, INC., Stamford, CT (US)

(72) Inventors: Seon Man Kim, Palo Alto, CA (US); Rajesh Khandelwal, Princeton Junction, NJ (US); Donald Butts, Milford, CT (US)

(73) Assignee: HARMAN INTERNATIONAL INDUSTRIES, INC., Stamford, CT (US)

( * ) Notice: Subject to any disclaimer, the term of this patent is extended or adjusted under 35 U.S.C. 154(b) by 131 days.

(21) Appl. No.: 14/183,364

(22) Filed: Feb. 18, 2014

(65) Prior Publication Data
US 2015/0235398 A1    Aug. 20, 2015

(51) Int. Cl.
*G06T 11/60* (2006.01)
*G06T 7/00* (2006.01)
*G02B 27/01* (2006.01)

(52) U.S. Cl.
CPC .......... *G06T 11/60* (2013.01); *G02B 27/0179* (2013.01); *G06T 7/0044* (2013.01); *G02B 2027/0181* (2013.01)

(58) Field of Classification Search
CPC .................................................. G06T 19/006
See application file for complete search history.

(56) References Cited

U.S. PATENT DOCUMENTS

2003/0210832 A1* 11/2003 Benton ................. G06T 19/006
382/284
2004/0169617 A1* 9/2004 Yelton ..................... G06T 15/10
345/1.1

(Continued)

FOREIGN PATENT DOCUMENTS

EP          2372627 A2 * 10/2011
WO      2011135778 A1    11/2011
WO   WO-2013/107458 A1 *  7/2013

OTHER PUBLICATIONS

Katia Moskvitch, BAE's Striker helmet gives fighter pilots 'X-ray vision', Sep. 3, 2012, BBC News, downloaded Apr. 17, 2016, 18 pages.*

(Continued)

*Primary Examiner* — Jeffery A Brier
(74) *Attorney, Agent, or Firm* — Artegis Law Group, LLP (57) ABSTRACT One embodiment of the present invention sets forth a technique for generating an augmented view of a location of interest for a user. The technique includes determining an image capture location based on the location of interest, and determining an image capture direction based on the image capture location. The technique further includes receiving an image associated with the image capture location and the image capture direction. The technique further includes processing the image based on a line of sight associated with a location of the user to generate a processed image and displaying the processed image to the user. Advantageously, the disclosed techniques enable a user to see through obstructions in the surrounding environment to view a location of interest.

21 Claims, 9 Drawing Sheets

(56) References Cited

U.S. PATENT DOCUMENTS

| | | | |
|---|---|---|---|
| 2004/0169663 A1* | 9/2004 | Bernier | G06T 15/10 345/629 |
| 2006/0210111 A1* | 9/2006 | Cleveland | G01C 3/14 382/103 |
| 2007/0139523 A1 | 6/2007 | Nishida et al. | |
| 2008/0158256 A1* | 7/2008 | Russell | G06T 7/0026 345/629 |
| 2009/0140881 A1 | 6/2009 | Sakai et al. | |
| 2009/0237510 A1* | 9/2009 | Chen | G06K 9/209 348/159 |
| 2010/0125407 A1* | 5/2010 | Cho | G01C 21/3602 701/533 |
| 2010/0315215 A1 | 12/2010 | Yuda | |
| 2011/0188760 A1* | 8/2011 | Wright | G06T 17/05 382/203 |
| 2012/0224060 A1* | 9/2012 | Gurevich | B60R 1/00 348/148 |
| 2013/0093788 A1* | 4/2013 | Liu | G06F 3/011 345/633 |
| 2014/0043433 A1* | 2/2014 | Scavezze | G06T 19/006 348/42 |
| 2015/0077562 A1* | 3/2015 | Heckel | G01S 17/936 348/148 |

OTHER PUBLICATIONS

"Streetside: The true-to-life experience for explorers everywhere," Microsoft Bing Maps, retrieved May 21, 2014, from http://www.microsoft.com/maps/streetside.aspx.

"Behind the Scenes: Street View," Google Maps, retrieved May 21, 2014, from http://www.google.com/maps/about/behind-the-scenes/streetview/.

European Search Report dated Jul. 30, 2015 in Application No. 15 15 5018.

\* cited by examiner

GENERATING AN AUGMENTED VIEW OF A LOCATION OF INTEREST

BACKGROUND

Field of the Embodiments of the Invention

Embodiments of the present invention generally relate to augmented reality and, more specifically, to generating an augmented view of a location of interest for a user.

Description of the Related Art

Navigation systems are widely used in a variety of applications to determine the location of a user and to provide directions to enable the user to navigate to a particular destination. A navigation system typically includes a location receiver that receives signals (e.g., geo-location signals) from one or more sources, including Global Positioning System (GPS) satellites, a wireless access point, a gyroscope, an inertial sensor, a compass, and the like. Based on the location signals received from the location receiver, navigation information is provided to the user.

In addition to providing a user with directions to a particular destination, current navigation systems often enable the user to view images of the navigation route and/or destination. For example, some navigation systems allow the user to preview a navigation route by viewing database images of the streets on which the user will be traveling. Thus, the user is able to become more familiar with the environment in which he or she will be traveling. However, viewing database images of the navigation route is often impractical once the user has embarked on a trip. For example, attempting to view database images via a mobile device, such as a smartphone, while walking or driving to a destination may distract the user, interfering with the user's ability to safely navigate his or her surroundings. As such, if the user becomes lost or wishes to view images of the navigation route or destination, he or she may have to stop walking or driving to operate his or her mobile device.

To address these shortcomings, some navigation systems implement augmented reality features, such as a heads-up display (HUD) that is overlaid with the user's field of view. For example, information such as turn-by-turn directions, street names, and the remaining distance to a destination may be displayed in the user's field of view, enabling the user to simultaneously view navigation information and pay attention to his or her surroundings. Additionally, some navigation systems attempt to overlay relevant information on objects in the surrounding area, such as by overlaying a street name, street number, and/or business names on a particular building. However, the overlay generated by current augmented reality systems is unable to provide the user with relevant information when an obstruction in the environment, such as a building or an automobile, is blocking the user's field of view. For example, if the user's view of a destination is obstructed by a building or an automobile in the surrounding area, the user may be unable to view the augmented reality information until the user has already reached the destination.

As the foregoing illustrates, improved techniques for providing a user with relevant navigation information would be useful.

SUMMARY

One embodiment of the present invention sets forth a method for generating an augmented view of a location of interest for a user. The method includes determining an image capture location based on the location of interest, and determining an image capture direction based on the image capture location. The method further includes receiving an image associated with the image capture location and the image capture direction. The method further includes processing the image based on a line of sight associated with a location of the user to generate a processed image and displaying the processed image to the user.

Further embodiments provide, among other things, a system and a non-transitory computer-readable medium configured to carry out method steps set forth above.

Advantageously, the disclosed techniques enable a user to see through obstructions in the surrounding environment to view a location of interest. Additionally, the disclosed techniques enable the user to continue to pay attention to his or her real-time surroundings while viewing the location of interest. Accordingly, by overlaying an image of the location of interest with the user's real-time field of view, navigation efficacy and user safety are increased.

BRIEF DESCRIPTION OF THE SEVERAL VIEWS OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1A:
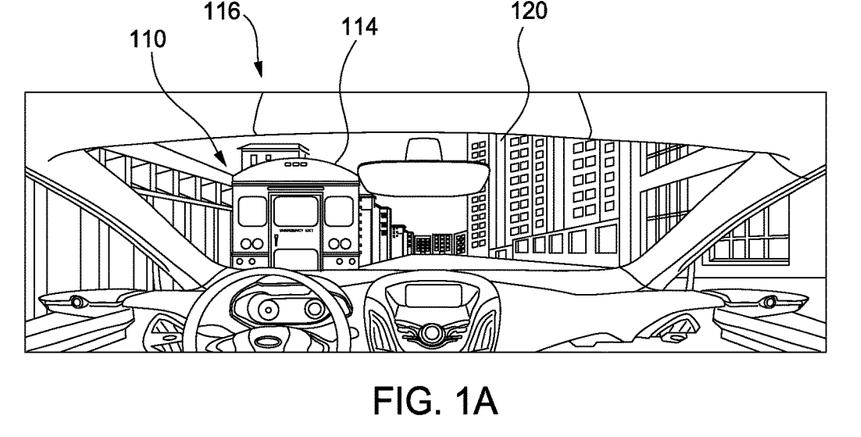
FIGS. 1A-1C are conceptual diagrams illustrating a technique for compositing an unobstructed image of a location of interest with a real-time view to generate an augmented view of the location of interest, according to various embodiments of the present invention.
Figure 1B:
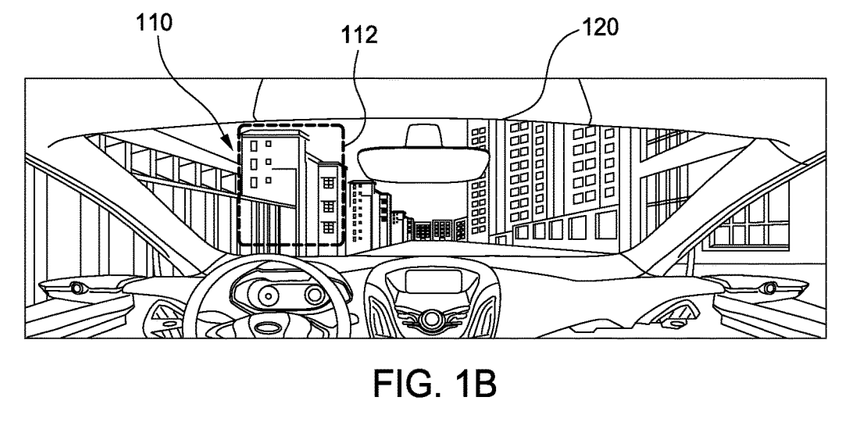
Figure 1C:
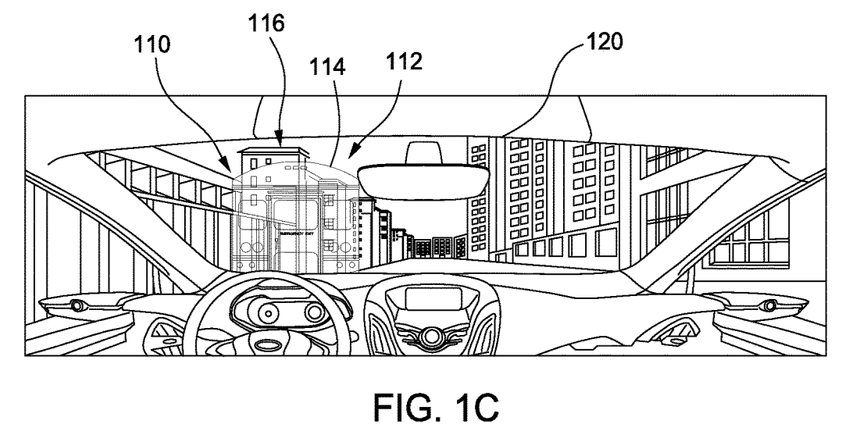

FIG. 1A-1C are conceptual diagrams illustrating a technique for compositing an unobstructed image 112 of a location of interest 110 with a real-time view 116 to generate an augmented view of the location of interest 110, according to various embodiments of the present invention. As shown in FIG. 1A, when a user is traveling, objects in the surrounding environment may obstruct the user's view, interfering with the user's ability to see locations of interest 110 such as signs, streets, buildings, landmarks, and the like. For example, in FIG. 1A, an obstruction 114 is blocking the user's view of a location of interest 110 (e.g., a building) to which the user is traveling. As a result, the user may not see the location of interest 110 in time to change traffic lanes and/or turn onto the appropriate street. Further, the user may unnecessarily expend attentional resources attempting to visually locate a location of interest 110 that is blocked by an obstruction 114, decreasing the user's ability to pay attention to pedestrians and other vehicles in the surrounding environment.

In order to enable the user to view a location of interest 110 that is behind an obstruction 114, an image 112 of the location of interest 110 may be acquired from a database and/or from a camera that is positioned in the surrounding environment. The image 112 of the location of interest 110 may then be displayed in the user's field of view, enabling the user to view the location of interest 110 while simultaneously viewing his or her real-time surroundings. In various embodiments, the image 112 of the location of interest 110 may be shown to the user on a display 120. The display 120 may be disposed on and/or projected onto any surface of the user's vehicle, including the windows (e.g., side windows, windshield, rear window, etc.), the mirrors (e.g., rearview mirror, side view mirrors, etc.), and/or a display screen. In some embodiments, the display 120 is a heads-up display (HUD) that is substantially transparent, enabling the user to view the location of interest 110 while also viewing his or her real-time surroundings. Among other things, displaying images 112 on a transparent display 120 allows the location of interest 110 to be composited with the user's real-time view 116, creating a substantially continuous view of the surrounding environment, as shown in FIG. 1B. Additionally, as shown in FIG. 1C, displaying the images 112 on a transparent display allows the opacity of the images 112 to be varied such that the user is able to view the obstruction 114 (e.g., the bus) in the same region of the display 120 in which the image 112 of the location of interest 110 is being displayed. Moreover, the opacity of the image 112 of the location of interest 110 may be varied relative to the user's real-time view 116 by capturing real-time images of the user's line of sight, compositing the real-time images with the images 112 of the location of interest 110, and displaying the composited images on the display 120. Such techniques are described below in further detail in conjunction with FIG. 2.

Figure 2:
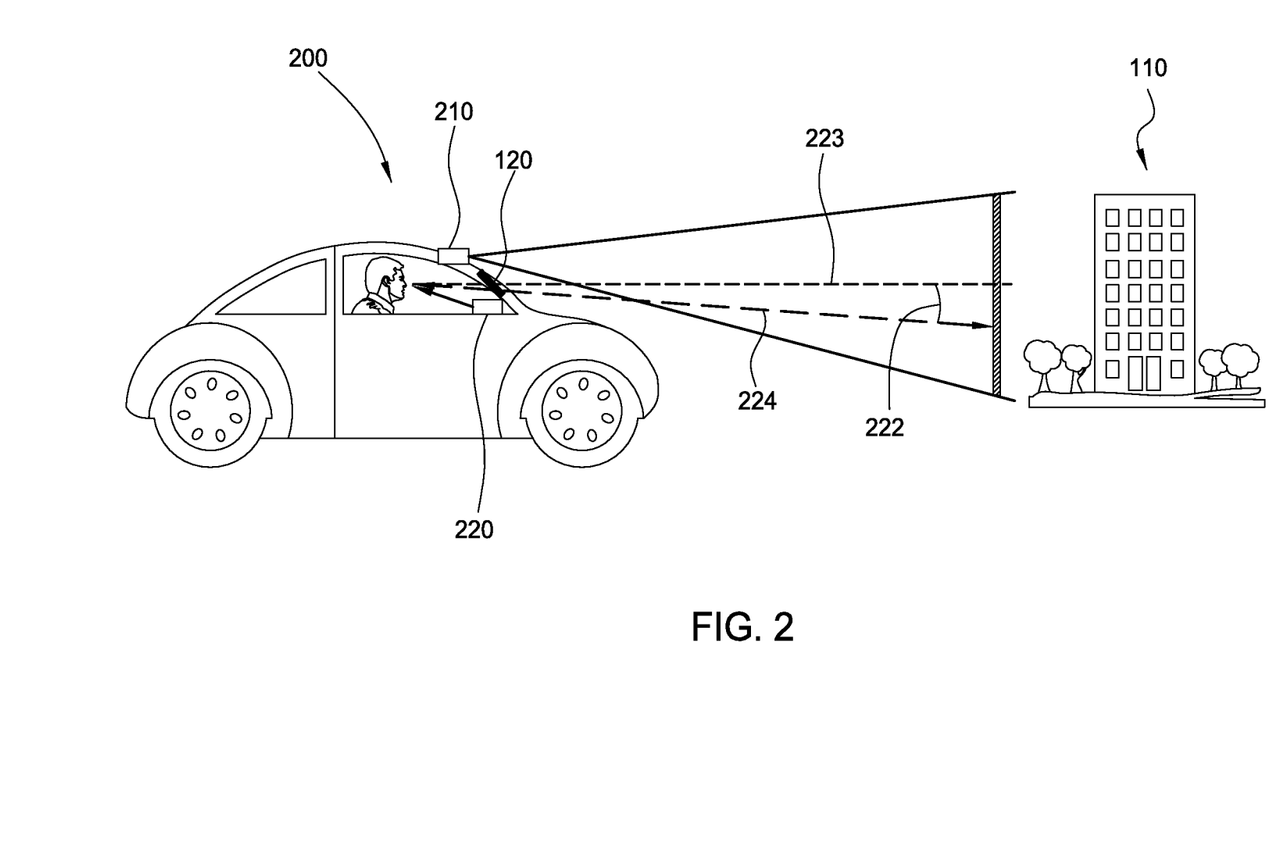
FIG. 2 is a conceptual diagram illustrating a technique for determining an image capture location and an image capture direction when generating an augmented view of a location of interest, according to various embodiments of the present invention.

FIG. 2 is a conceptual diagram of a navigation system 200 for displaying an augmented view of a location of interest 110 to a user, according to various embodiments of the present invention. As shown, the navigation system 200 may include a display 120, a camera 210, and a tracking device 220. The camera 210 may be configured to capture images of the user's surroundings, such as the real-time view 116 described above. The camera 210 may be located in a position that enables it to capture images from the user's point of view. For example, the camera 210 may be located above, below, or to the side of the user's line of sight. In some embodiments, the camera 210 may be mounted on a vehicle in which the user is traveling and/or on the user himself or herself.

In operation, the navigation system 200 receives a location of interest 110. The location of interest 110 may be inputted by the user, determined by the navigation system 200, and/or received from a secondary device, such as a database. The location of interest 110 may include a street address, street number, name, city, state, coordinates, and/or any other information that enables the navigation system 200 to determine the identity and/or the location of interest 110. The navigation system 200 may further determine the location of the user relative to the location of interest 110. The location of the user may be determined using any type of geolocation device, including Global Positioning System (GPS) devices, wireless communication devices, time-of-flight devices, radio frequency (RF) devices, optical devices, and the like.

After receiving the location of interest 110, the navigation system 200 receives an image 112 associated with the location of interest 110 from a database or from a camera that is located in the surrounding area. In some embodiments, the camera is proximate to the location of interest 110 such that the camera can capture an unobstructed image 112 of the location of interest 110 and transmit the image to the navigation system 200. The database may be a navigation database, such as Google® Street View, that includes images of various streets and paths captured from multiple locations and from multiple directions.

The image 112 of the location of interest 110 received from the database and/or captured by a camera is associated with an image capture location. The image capture location may be selected to provide the user with an image 112 of the location of interest 110 that is of an appropriate perspective (e.g., similar to the user's perspective) and is relatively unobstructed by objects in the surrounding environment. In various embodiments, the image capture location may be determined based on one or both of the location of interest 110 and the location of the user. For example, if the location of interest 110 is a place of business that is on a street along which the user is walking or driving, then the image capture location may be positioned between the user and the location of interest 110, for example, in the line of sight between the user and the location of interest 110. Thus, if the user is approaching the location of interest 110 from the south, then the image capture location may be positioned to the south of the location of interest 110—between the location of the user and the location of interest 110—in order to provide an image 112 having the proper perspective.

The image 112 of the location of interest 110 received from the database and/or captured by a camera also may be associated with an image capture direction. As described above with respect to the image capture location, the image capture direction may be selected to provide the user with an image 112 of the location of interest 110 that is of an appropriate perspective (e.g., similar to the user's perspective). The image capture direction may be determined based on one or more of the location of interest 110, the location of the user, and the image capture location. For example, if the image capture location is positioned between the user and the location of interest 110, then the image capture direction may be selected to substantially match the direction of the line of sight from the user to the location of interest 110. Thus, if the user is approaching the location of interest 110 from the south, then the image capture direction may be substantially northward in order to provide an image 112 having the proper perspective. Alternatively, if the image capture location is not positioned substantially along the line of sight between the user and the location of interest 110, for example, if an image 112 associated with the image capture location described above is not available, then the image capture direction may be selected to compensate for the difference in perspective between the image capture location and the location of the user. In addition, the image 112 itself may be processed (e.g., via a transform) to compensate for the difference in perspective between the image capture location and the location of the user, as is described below in further detail.

In various embodiments, the image capture location and/or image capture direction may be determined by comparing one or more images 112 of the location of interest 110 that are stored in a database or captured by one or more cameras in the surrounding area to the real-time view 116 of the user. For example, the navigation system 200 may compare one or more relevant portions of the images 112 of the location of interest 110—captured at one or more image capture locations and/or image capture directions—to corresponding portions of images of the real-time view 116 that are captured by the camera 210. The navigation system 200 may then determine which image(s) are the closest match to the real-time view 116. These image(s) 112 may then be processed and displayed to the user on the display 120, such as by applying a transform and compositing the image(s) 112 with the real-time view 116.

Prior to displaying the image 112 of the location of interest 110 to the user on the display 120, the image 112 may be processed. Processing may include, for example, applying a transform to the image 112, resizing the image 112, cropping the image 112, and/or combining multiple images 112 into a single image 112 such that the image 112 and the real-time view 116 are substantially continuous when the image 112 is displayed to the user. In addition, the opacity of the image 112 may be modified to more effectively blend the image 112 with the real-time view 116 and/or to enable the user to simultaneously view both the image 112 and corresponding portion(s) of the real-time view 116 (e.g., the obstruction 114). Further, in some embodiments, the image 112 of the location of interest 110 may be composited with images of the real-time view 116, and the resulting composited image(s) may be displayed to the user on the display 120. Compositing the image 112 of the location of interest 110 with images of the real-time view 116 may be useful when the display 120 is not in the line of sight between the user and the location of interest 110. In other embodiments, only the image 112 (e.g., the processed image 112) of the location of interest 110, but images of the real-time view 116, is displayed on the display 120, such as on a vehicle window (e.g., the windshield).

The tracking device 220 may include, without limitation, one or more cameras and/or sensors configured to determine the position and/or eye gaze direction 223 (e.g., horizontal angle and/or vertical angle) of the user. Images acquired by the camera(s) and/or sensor(s) may be analyzed by a computing device included in the tracking device 220 and/or associated with the navigation system 200. For example, as shown in FIG. 2, a camera may be configured to acquire images of a user's eyes or face. The images may then be analyzed to determine the position of the user relative to the display 120 and/or the direction in which the user is looking.

The position of the user and/or the eye gaze direction 223 may be used to determine the location of interest 110, the image capture location, and/or the image capture direction. For example, the user may activate an augmented view function of the navigation device 200 and then look in the direction of a location of interest 110. In response, the tracking device 220 may detect the user's eye gaze direction 223 and transmit the eye gaze direction 223 to a computing device associated with the navigation system 200. The computing device may then use the eye gaze direction 223 to determine the location of interest 110 at which the user is looking and to select an appropriate image capture location and/or image capture direction. Images 112 associated with the image capture location and/or image capture direction may then be displayed to the user. Further, the position of the user relative to the display 120 (e.g., the position of the user within the vehicle) may be used to determine and/or refine the image capture location and/or image capture direction. For example, if the user moves to the left or right within the vehicle, then the image capture location and/or image capture direction may be modified so that the image 112 of the location of interest 110 displayed to the user more accurately reflects the user's perspective. Moreover, the position of the user relative to the display 120 may be used to determine how to process the image 112 (e.g., via transform, zooming, cropping, etc.) prior to displaying the image 112 to the user.

Once the navigation system 200 receives an image 112 of the location of interest 110, the image 112 may be processed to compensate for the difference in the height at which the image 112 was captured and the height of the user's line of sight. For example, if the image 112 is acquired from a database, such as Google® Street View, then the image 112 may have been captured at a height that is above the user's line of sight. Accordingly, a transform may be applied to the image 112 to compensate for the angle 222 between the line of sight of the user and the line of sight of the camera (e.g., Google® Street View camera).

In some embodiments, the navigation device 200 is worn by the user. For example, the navigation device 200 may be a headset or pair of glasses worn by the user. In such embodiments, the camera 210, tracking device 220, and/or display 120 could be positioned in the navigation device 200 proximate to the user's eyes to determine the eye gaze direction 223 and provide the user with images 112 of the location of interest 110. For example, one or more cameras may be positioned in a headset or pair of glasses near the user's eyes.

Under certain circumstances, a user of the navigation device 200 may wish to view a location of interest 110 that is on the other side of a street corner. For example, when a user is traveling, the user may wish to view what is on a particular street, prior to reaching the street, in order to determine whether he or she should turn down the street. Accordingly, some of the techniques described above may be applied to provide the user with images 112 of the buildings and/or other locations of interest 110 that are around a street corner. Such implementations are discussed below in conjunction with FIGS. 3A-5.

Figure 3A:
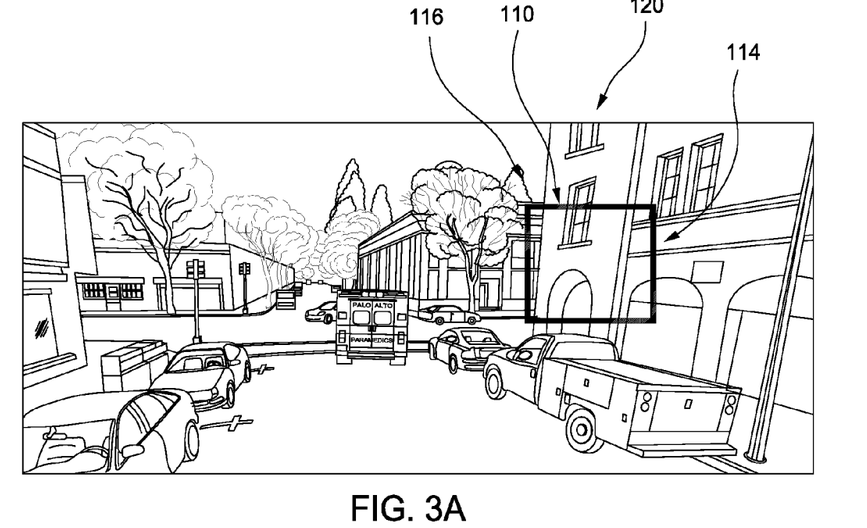
FIGS. 3A and 3B are conceptual diagrams illustrating a technique for generating an augmented view of a location of interest that is obstructed by a street corner, according to various embodiments of the present invention.
Figure 3B:
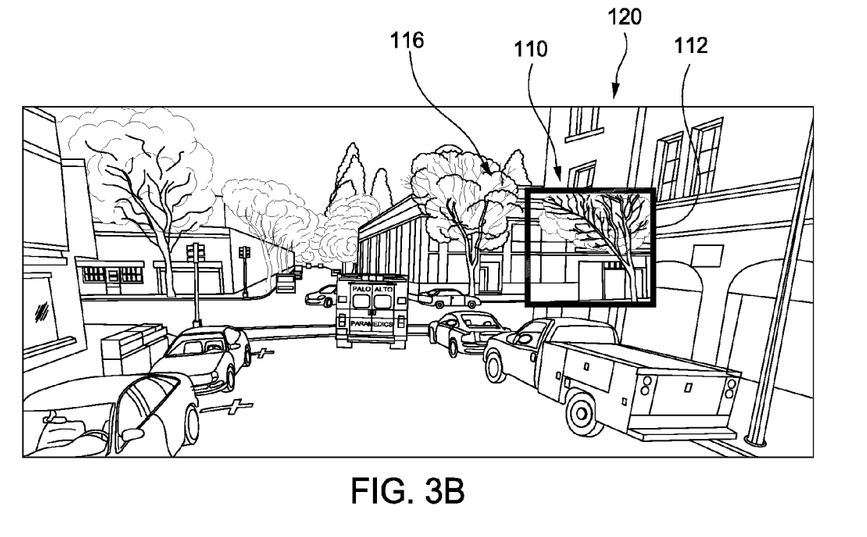

FIGS. 3A and 3B are conceptual diagrams illustrating a technique for generating an augmented view of a location of interest 110 that is obstructed by a street corner, according to various embodiments of the present invention. As shown, when approaching a street corner, a user may wish to view the buildings, landmarks, signs, etc. that are being obstructed by the street corner. Accordingly, the user may activate an augmented view function of the navigation device 200 and input the relevant location of interest 110 (e.g., via a keyboard, voice command, eye gaze direction 223, and the like). In response, the navigation system 200 may determine an image capture location and/or image capture direction based on the location of the user relative to the location of interest 110, as described below in further detail in conjunction with FIG. 4. The navigation system 200 may then receive an image 112 of the location of interest 110 based on the image capture location and/or image capture direction and perform optional processing on the image 112. The image 112 is then displayed to the user on the display 120. For example, as shown in FIG. 3B, the image 112 of a location of interest 110 that is on the other side of a street corner may be displayed to the user on a transparent display 120, such as a car window, enabling the user to view the real-time view 116 in conjunction with the image 112.

Figure 4:
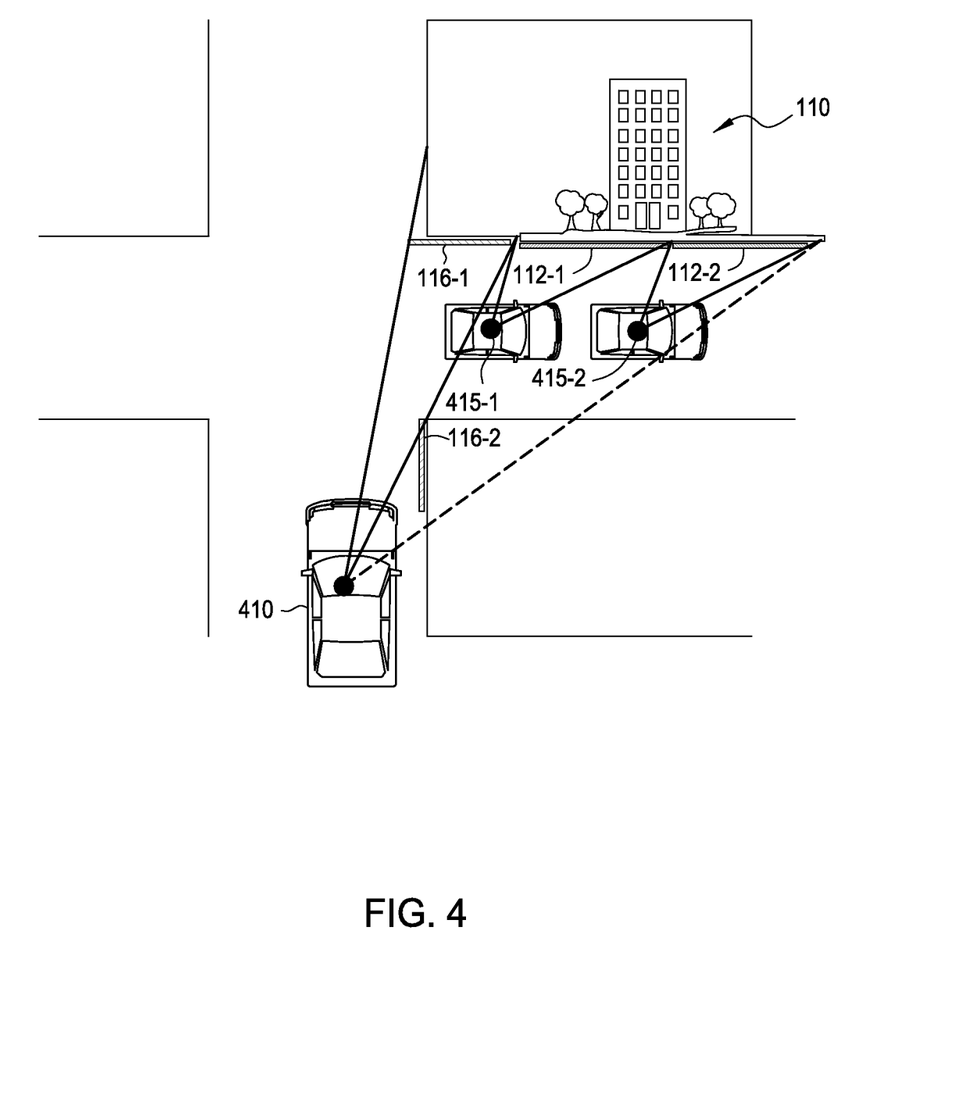
FIG. 4 is a conceptual diagram illustrating a technique for determining image capture location(s) and image capture direction(s) when generating an augmented view of a location of interest that is obstructed by a street corner, according to various embodiments of the present invention.

FIG. 4 is a conceptual diagram illustrating a technique for determining image capture location(s) 415 and image capture direction(s) when generating an augmented view of a location of interest 110 that is obstructed by a street corner, according to various embodiments of the present invention. As shown, one or more images 112, each associated with a different image capture location 415 and/or image capture direction, may be acquired from a database and/or from a camera that is proximate to the location of interest 110. When multiple images 112 are acquired, the images 112 may be combined to form a single, continuous image 112 that is displayed to the user. Additionally, the image(s) 112 may be combined with the real-time view 116 of the user. For example, as shown, images of real-time view 116-1 and real-time view 116-2, associated with the location of the user 410, may be combined with an image 112-1 captured at image capture location 415-1 and an image 112-2 captured at image capture location 415-2 to form a continuous image that is displayed to the user. In other embodiments, the continuous image may be generated by combining only image 112-1 and image 112-2. The resulting image 112 may then be processed (e.g., according to the perspective of the user) and displayed in the appropriate position in the field of view of the user so that the image 112 appears substantially continuous with real-time view 116-1 and real-time view 116-2.

In addition to compositing the real-time view(s) 116 with the images 112 of the location of interest 110, the real-time view(s) 116 may be used to determine which image capture location(s) and/or image capture direction(s) provide the closest match to the real-time view 116 associated with the location of the user 410. For example, a computing device associated with navigation system 200 may compare one or more portions of the real-time view 116 (e.g., real-time view 116-1 and 116-2) to one or more corresponding portions of images 112 acquired from a database or camera to determine which image(s) 112 most closely match the perspective of the user. Images 112 that provide an appropriate level of continuity with the real-time view 116 may then be processed and displayed to the user.

Figure 5:
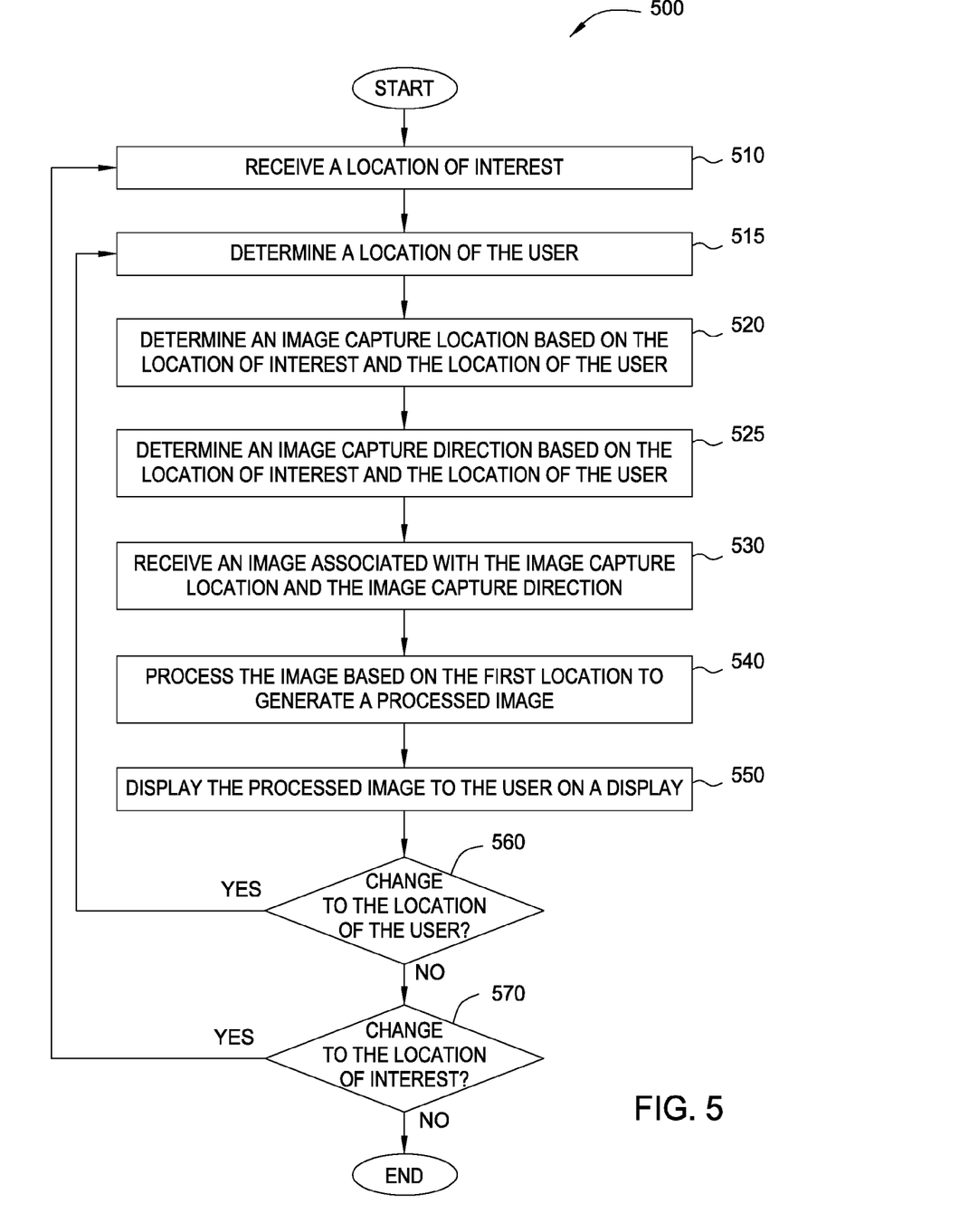
FIG. 5 is a flow diagram of method steps for generating an augmented view of a location of interest for a user, according to various embodiments of the present invention.

FIG. 5 is a flow diagram of method steps for generating an augmented view of a location of interest for a user, according to various embodiments of the present invention. Although the method steps are described in conjunction with the systems of FIGS. 1-4, persons skilled in the art will understand that any system configured to perform the method steps, in any order, falls within the scope of the present invention.

As shown, a method 500 begins at step 510, where the navigation system 200 receives a location of interest 110. The location of interest 110 may be inputted by the user, determined by the navigation system 200, and/or received from a secondary device, such as a database. At step 515, the navigation system 200 determines the location of the user. The location of the user may be determined using any type of geolocation device, including Global Positioning System (GPS) devices, wireless communication devices, time-of-flight devices, radio frequency (RF) devices, optical devices, and the like.

Next, at step 520, the navigation system 200 determines an image capture location based on the location of interest 110 and the location of the user. At step 525, the navigation system 200 may determine an image capture direction based on the location of interest 110, the location of the user, and/or the image capture location. Then, at step 530, the navigation system 200 receives an image 112 of the location of interest 110 associated with the image capture location and the optional image capture direction.

At step 540, the navigation system 200 and/or a computing device associated with the navigation system 200 may process the image 112. Processing may include, for example, applying a transform to the image 112, resizing the image 112, cropping the image 112, combining multiple images 112 into a single image 112, and the like. At step 550, the processed image 112 is displayed to the user on a display 120.

At step 560, the navigation system 200 determines whether there has been a change to the location of the user. If there has been a change to the location of the user, then the method 500 returns to step 515, where the location of the user is determined. If there has not been a change to the location of the user, then the method 500 proceeds to step 570. At step 570, the navigation system 200 determines whether there has been a change to the location of interest 110. If there has been a change to the location of interest 110, then the method 500 returns to step 510, where a different location of interest 110 is received. If there has not been a change to the location of interest, then the method 500 ends.

Figure 6A:
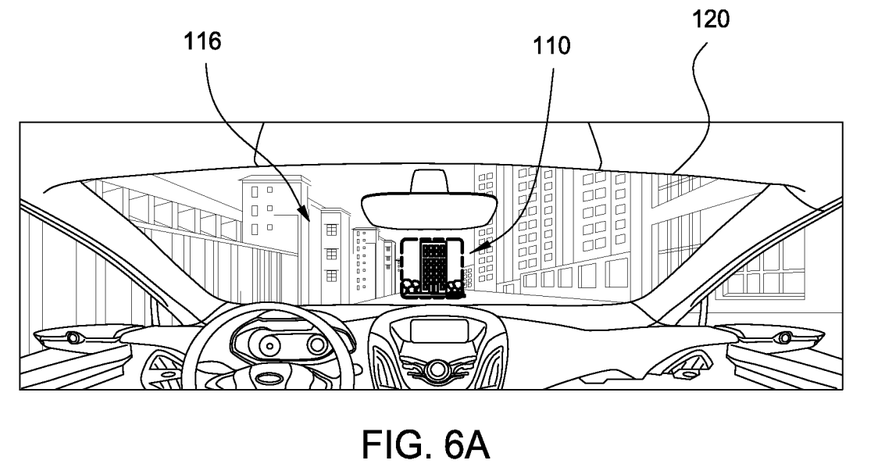
FIGS. 6A and 6B are conceptual diagrams illustrating a technique for generating a magnified view of a location of interest, according to various embodiments of the present invention.
Figure 6B:
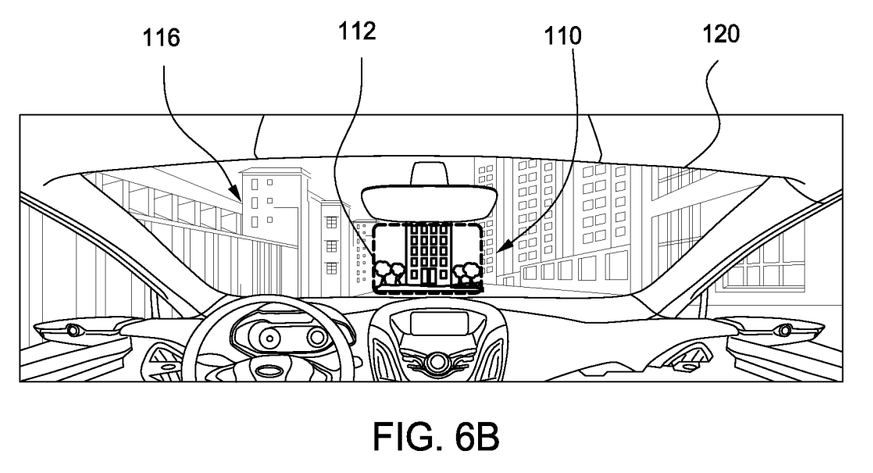

In addition to generating an augmented view of an obstructed location of interest 110 for a user, the navigation system 200 may be configured to generate an augmented view of a location of interest 110 that is relatively unobstructed, but which is relatively far away from the user. Such implementations are illustrated in FIGS. 6A and 6B, which are conceptual diagrams illustrating a technique for generating a magnified view of a location of interest 110, according to various embodiments of the present invention. As shown in FIG. 6A, when a user is approaching an unobstructed location of interest 110, the user may wish to more easily view details associated with the location of interest 110. Accordingly, the navigation system 200 may acquire an image 112 of the location of interest 110 and display the image 112 on the display 120 according to a zoom level specified by the user or determined by the navigation system 200. The resulting image 112 of the location of interest 110 is shown in FIG. 6B. As shown, by generating a magnified image of the location of interest 110, the user may more easily view details associated with the location of interest 110.

The magnified image 112 displayed to the user may be acquired from a database, as described above, or from a camera that is proximate to the location of interest 110. Such implementations are described in further detail below in conjunction with FIG. 6. Alternatively, the magnified image 112 displayed to the user may be acquired by a camera (e.g., camera 210) associated with the navigation system 200 and/or coupled to the user or the user's vehicle. For example, the camera 210 associated with the navigation system 200 may provide a magnified image 112 of the location of interest 110 via an optical zoom or digital zoom function. In other embodiments, an image 112 captured by the camera 210 may be magnified by a computing device associated with the navigation system 200. The magnified image 112 may then be displayed to the user in an appropriate position relative to the real-time view 116.

Figure 7:
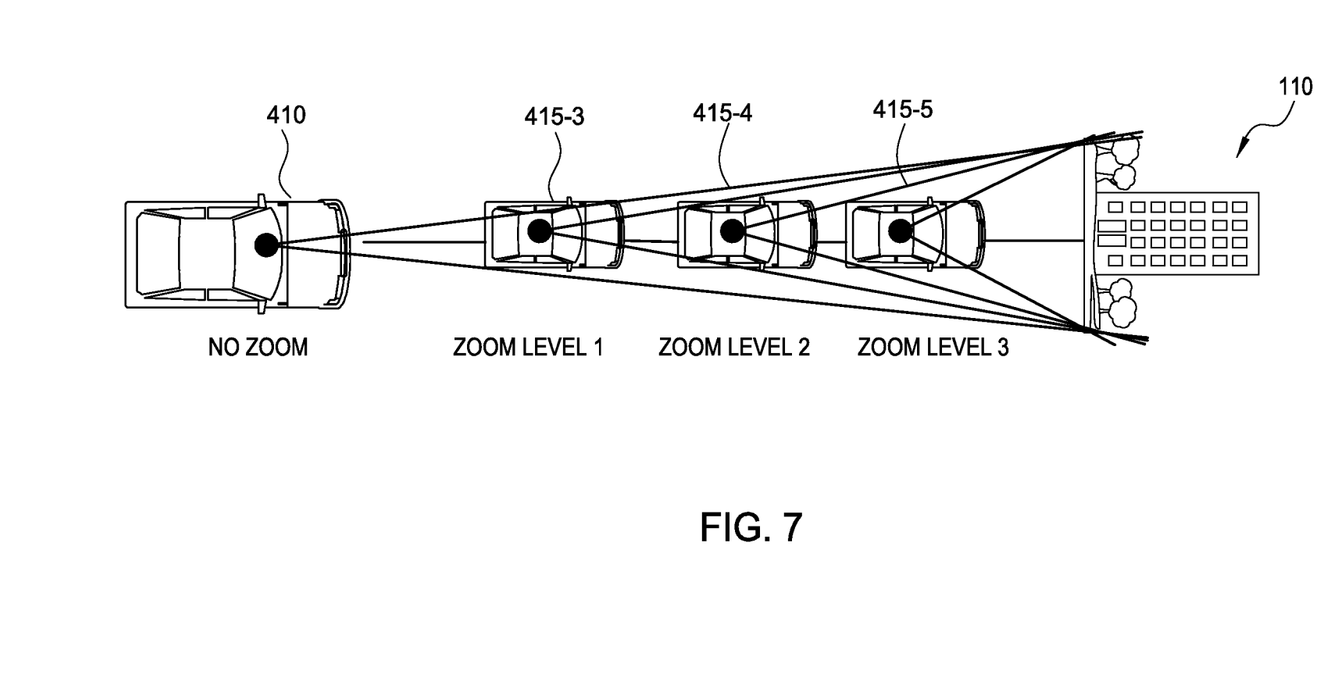
FIG. 7 is a conceptual diagram illustrating a technique for determining an image capture location based on a zoom level when generating a magnified view of a location of interest, according to various embodiments of the present invention.

FIG. 7 is a conceptual diagram illustrating a technique for determining an image capture location based on a zoom level when generating a magnified view of a location of interest 110, according to various embodiments of the present invention. As shown, the image capture location 415 selected by the navigation system 200 may be based on a zoom level specified by the user or selected by the navigation system 200. For example, image capture location 415-3 may be selected by the navigation system 200 if the user inputs a relatively low zoom level, such as a zoom level of 2×, and image capture location 415-5 may be selected by the navigation system 200 if the user inputs a relatively high zoom level, such as a zoom level of 24×. In various embodiments, the user may specify the zoom level at which the location of interest 110 is to be displayed by issuing a voice command to the navigation system 200 or by inputting the zoom level on a keyboard, switch, knob, or other input device.

In addition to selecting an appropriate image capture location based on the zoom level, in some embodiments, an image capture direction may be selected to provide an image 112 having the appropriate perspective, as described above in conjunction with FIGS. 1A-5. Moreover, the image 112 acquired for a given zoom level may be processed according to the techniques described above to compensate for a difference in perspective between the image capture location and the location of the user 410. Further, although the images 112 in FIG. 6 are illustrated as being captured by vehicles, such as a Google® Street View vehicle or a vehicle positioned in the surrounding environment (e.g., via vehicle-to-vehicle (V2V) communication), the images 112 may be captured from other objects (e.g., surveillance cameras on poles, street signs, buildings, etc.) and locations in the surrounding environment.

In some embodiments, the techniques for viewing a location of interest 110 that is obstructed by an object and/or a street corner, described above in conjunction with FIGS. 1A-5, may be combined with the techniques for displaying a magnified image 112 of a location of interest 110 to a user, described above in conjunction with FIGS. 6A-7. For example, instead of display an image 112 of the location of interest 110 to generate a continuous image from the perspective of the user, the image 112 may be magnified to enable the user to more easily view details associated with the location of interest 110. As described above, magnification of the image 112 may be specified by the user and/or selected by the navigation system to provide zoom levels ranging from no zoom—such that the image 112 is substantially continuous with the real-time view 116—to a high level of zoom (e.g., 12×, 24×, or higher).

Figure 8:
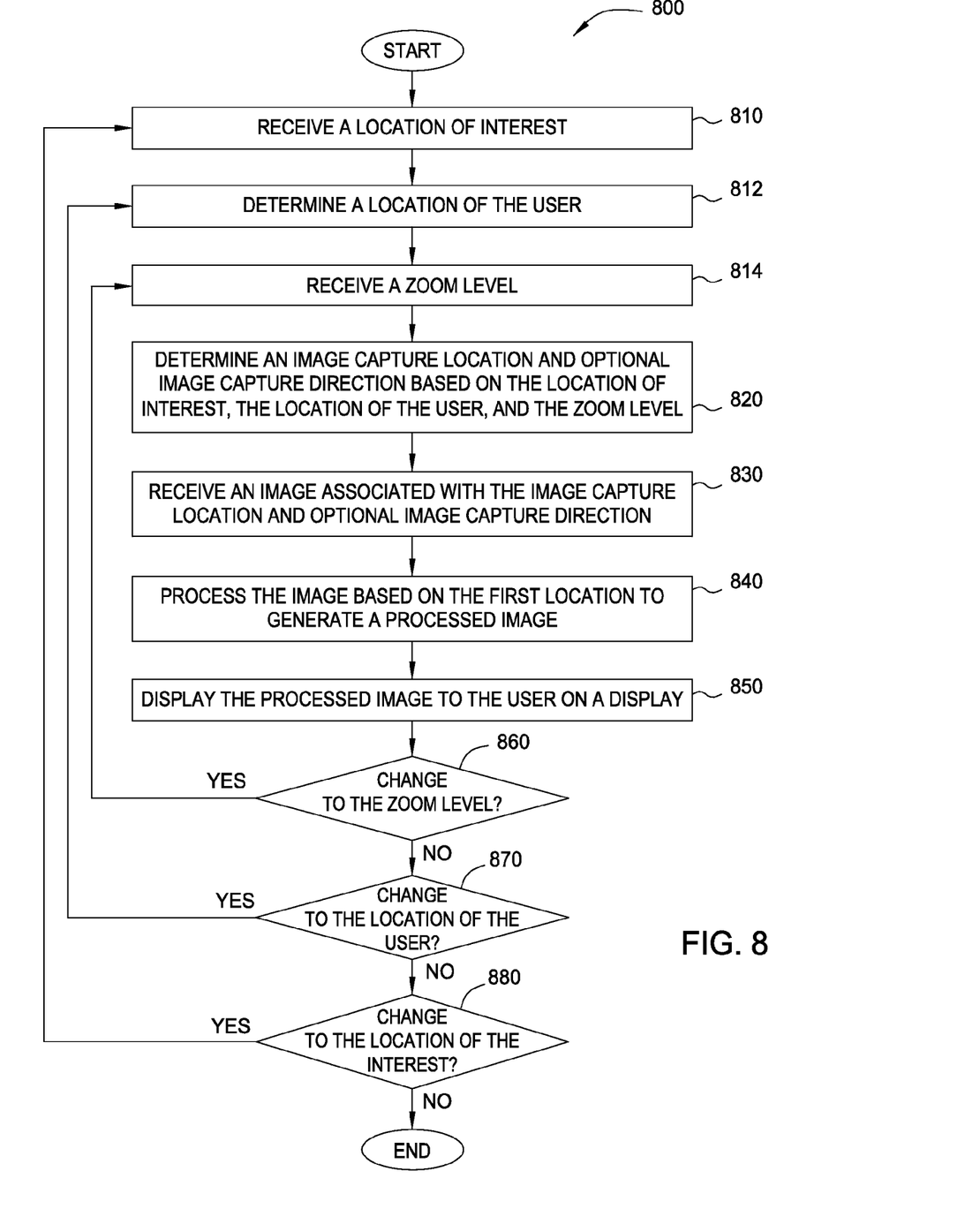
FIG. 8 is a flow diagram of method steps for generating a magnified view of a location of interest 110 for a user, according to various embodiments of the present invention.

FIG. 8 is a flow diagram of method steps for generating a magnified view of a location of interest for a user, according to various embodiments of the present invention. Although the method steps are described in conjunction with the systems of FIGS. 1-4 and 6-7, persons skilled in the art will understand that any system configured to perform the method steps, in any order, falls within the scope of the present invention.

As shown, a method 800 begins at step 810, where the navigation system 200 receives a location of interest 110. At step 812, the navigation system 200 determines the location of the user. At step 814, the navigation system 200 receives a zoom level. The zoom level may be selected by the navigation system 200 (e.g., based on an algorithm), or the user may specify the zoom level by issuing a voice command to the navigation system 200 or by inputting the zoom level on a keyboard, switch, knob, or other input device.

Next, at step 820, the navigation system 200 determines an image capture location and optional image capture direction based on the location of interest 110, the location of the user, and/or the zoom level. At step 830, the navigation system 200 receives an image 112 of the location of interest 110 associated with the image capture location and the optional image capture direction. Then, at step 840, the navigation system 200 and/or a computing device associated with the navigation system 200 may process the image 112. At step 850, the processed image 112 is displayed to the user on a display 120.

At step 860, the navigation system 200 determines whether there has been a change to the zoom level. If there has been a change to the zoom level, then the method 800 returns to step 814, where a different zoom level is received. If there has not been a change to the zoom level, then the method 800 proceeds to step 870. At step 870, the navigation system 200 determines whether there has been a change to the location of the user. If there has been a change to the location of the user, then the method 800 returns to step 812, where the location of the user is determined. If there has not been a change to the location of the user, then the method 800 proceeds to step 880. At step 880, the navigation system 200 determines whether there has been a change to the location of interest 110. If there has been a change to the location of interest 110, then the method 800 returns to step 810, where a different location of interest 110 is received. If there has not been a change to the location of interest, then the method 800 ends.

Figure 9:
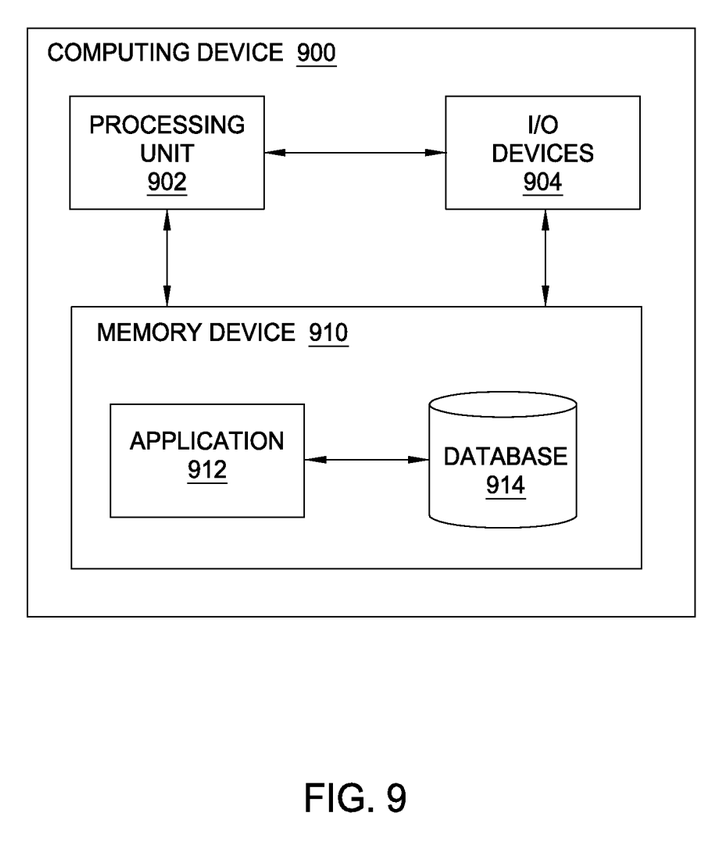
FIG. 9 is a block diagram illustrating a computing device configured to implement one or more aspects of the present invention.

FIG. 9 is a block diagram illustrating a computing device 900 configured to implement one or more aspects of the present invention. As shown, computing device 900 includes a processing unit 902, input/output (I/O) devices 904, and a memory unit 910. Memory unit 910 includes an application 912 configured to interact with a database 914.

Processing unit 902 may include a central processing unit (CPU), digital signal processing unit (DSP), and so forth. I/O devices 904 may include input devices, output devices, and devices capable of both receiving input and providing output. Memory unit 910 may include a memory module or a collection of memory modules. Software application 912 within memory unit 910 may be executed by processing unit 902 to implement the overall functionality of computing device 900, and, thus, to coordinate the operation of the navigation system 200 as a whole. The database 914 may store locations of interest 110, images 112, images associated with real-time views 116, GPS coordinates, object locations, object distances, lookup tables, and other data for generating augmented views of locations of interest 110 and acquiring information associated with the locations of interest 110.

Computing device 900 may be coupled to the camera 210 and the tracking device 220. The camera 210 may be configured to capture images of a real-time view 116 of a user. The tracking device 220 may include one or more sensors, such as one or more cameras and/or depth sensors. The tracking device 220 may be configured to measure various properties of the environment within which user resides, as well as various properties associated with user (e.g., location, position, orientation, and eye gaze direction 223). The tracking device 220 may include any number of cameras, depth sensors, light sensors, or any other type of sensor. Generally, the tracking device 220 captures sensory data associated with the environment and sensory data associated with user, and provides that data to computing device 900.

Computing device 900 as a whole may be a microprocessor, an application-specific integrated circuit (ASIC), a system-on-a-chip (SoC), a mobile computing device such as a tablet computer or cell phone, a media player, and so forth. Generally, computing device 900 is configured to coordinate the overall operation of the navigation system 200. Any technically feasible system configured to implement the functionality of the navigation system 200 falls within the scope of the present invention.

In sum, a navigation system determines an image capture location and an image capture direction based on a location of interest and a location of a user. The navigation system then receives an image of the location of interest from a database and/or from a camera that is proximate to the location of interest. The image is based on the image capture location and/or the image capture direction. Next, the navigation system may process the image by applying a transform based on the location of the user. The processed image is then displayed to the user.

One advantage of the techniques described herein is that a user is able to see through obstructions in the surrounding environment to view a location of interest. Additionally, the disclosed techniques enable the user to continue to pay attention to his or her real-time surroundings while viewing the location of interest. Accordingly, by overlaying an image of the location of interest with the user's real-time field of view, navigation efficacy and user safety are increased.

One embodiment of the invention may be implemented as a program product for use with a computing device. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. For example, although many of the descriptions herein refer to the user as a driver or passenger of a vehicle, persons skilled in the art will appreciate that the systems and techniques described herein are applicable to other situations (e.g., non-vehicular) in which generating augmented views of a location of interest may enhance user experience and/or user safety. The foregoing description and drawings are, accordingly, to be regarded in an illustrative rather than a restrictive sense.

Therefore, the scope of embodiments of the present invention is set forth in the claims that follow.

What is claimed is:

1. A method implemented by a vehicle navigation device for generating an augmented view of a location of interest for a user, the method comprising:
   detecting an eye gaze direction of the user;
   determining the location of interest that is directly behind an obstruction at which the user is looking based on the eye gaze direction;
   selecting an image capture location based on the location of interest;
   selecting an image capture direction based on the image capture location;
   receiving an image associated with the image capture location and the image capture direction;
   processing the image based on a line of sight associated with a location of the user to generate a processed image; and
   displaying the processed image to the user.

2. The method of claim 1, wherein processing the image comprises projecting the line of sight through a surface of a display to determine a transform, and applying the transform to the image.

3. The method of claim 2, wherein an automobile window comprises the surface of the display.

4. The method of claim 1, further comprising receiving an image of a real-time view associated with the line of sight, and wherein processing the image comprises comparing the image to the image of the real-time view, and aligning at least one portion of the image with at least one portion of the image of the real-time view.

5. The method of claim 4, wherein the image of the real-time view comprises an obstructed view of the location of interest, and the image comprises a substantially unobstructed view of the location of interest.

6. The method of claim 4, wherein processing the image further comprises compositing the image with the image of the real-time view.

7. The method of claim 1, further comprising receiving a zoom value from the user, and wherein determining the image capture location is further based on the zoom value.

8. The method of claim 1, wherein the location of the user is derived from one or more geolocation signals.

9. The method of claim 1, further comprising determining an eye gaze direction of the user, and selecting the location of interest based on the location of the user and the eye gaze direction.

10. A vehicle navigation system for generating an augmented view of a location of interest for a user, comprising:
    a processor configured to:
      receive an eye gaze direction of the user;
      determine the location of interest that is directly behind an obstruction at which the user is looking based on the eye gaze direction;
      select a first image capture location based on the location of interest;
      select an image capture direction based on the image capture location;
      receive a first image acquired at the first image capture location based on the image capture direction; and
      process the first image based on a line of sight associated with a location of the user to generate a processed image; and a display configured to display the processed image to the user.

11. The system of claim 10, wherein the processor is configured to process the first image by projecting the line of sight through a surface of the display to determine a transform and applying the transform to the first image.

12. The system of claim 11, wherein the display is disposed in an automobile window.

13. The system of claim 10, wherein the processor is further configured to receive an image of a real-time view associated with the line of sight, and the processor is configured to process the first image by comparing the first image to the image of the real-time view to determine a transform, and applying the transform to the first image to align at least one portion of the first image with at least one portion of the image of the real-time view.

14. The system of claim 13, wherein the image of the real-time view comprises an obstructed view of the location of interest, and the first image comprises a substantially unobstructed view of the location of interest.

15. The system of claim 10, wherein the processor is further configured to receive an image of a real-time view associated with the line of sight, and the processor is configured to process the first image by aligning at least one portion of the first image with at least one portion of the image of the real-time view and compositing the first image with the image of the real-time view.

16. The system of claim 10, wherein the processor is further configured to determine a second image capture location based on the location of the user and the location of interest, and receive a second image acquired at the second image capture location, and wherein the processor is configured to process the first image by combining the first image with the second image.

17. The system of claim 16, wherein the first image is associated with a first perspective of the location of interest, and the second image is associated with a second perspective of the location of interest.

18. The system of claim 10, further comprising a tracking device configured to determine the eye gaze direction of the user.

19. The system of claim 10, wherein the obstruction comprises a vehicle or a building corner.

20. The system of claim 10, wherein the first image comprises a real-time, unobstructed view of the location of interest acquired via a camera mounted on a vehicle.

21. A non-transitory computer-readable storage medium including instructions that, when executed by a processor, cause the processor to generate an augmented view of a location of interest for a user, by performing the steps of:
    detecting an eye gaze direction of the user;
    determining the location of interest that is directly behind an obstruction at which the user is looking based on the eye gaze direction;
    selecting an image capture location based on the location of interest;
    selecting an image capture direction based on the image capture location;
    receiving an image associated with the image capture location and the image capture direction;
    processing the image based on a line of sight associated with a location of the user to generate a processed image; and
    displaying the processed image to the user.

* * * * *